J. A. E. ACHENBACH.
DRY BATTERY.
APPLICATION FILED JAN. 7, 1913.

1,090,372.

Patented Mar. 17, 1914.

Inventor
J. A. E. Achenbach.

Witnesses

By Howard A. Coombs
his Attorney

UNITED STATES PATENT OFFICE.

JULIUS ADOLPH ERWIN ACHENBACH, OF HAMBURG, GERMANY.

DRY BATTERY.

1,090,372.   Specification of Letters Patent.   Patented Mar. 17, 1914.

Application filed January 7, 1913. Serial No. 740,625.

*To all whom it may concern:*

Be it known that I, JULIUS ADOLPH ERWIN ACHENBACH, a subject of the German Emperor, and residing at Hamburg, in Germany, have invented new and useful Improvements in Dry Batteries, of which the following is a specification.

My invention relates to dry batteries with jellified electrolytes, and its object is to prevent deterioration of the batteries caused by the shrinking of the electrolyte under continued use. In batteries of this type it often occurs that the jelly-like electrolyte shrinks, whereby the contact with the negative electrode is made imperfect or even entirely broken, on account of a space being formed between the electrolyte and the smooth rigid cylinder or plate, forming the negative electrode. This defect can be removed, I have found, by changing the form of the negative electrode, which is usually of zinc. This shrinking of the electrolyte is the main reason why dry batteries have only a limited life, since their capacity diminishes materially as soon as the electrolyte is no longer in intimate connection with the zinc electrode. This defect is entirely obviated when the negative electrode (usually of zinc) is not made as a smooth plate or cylinder, but when the space between the positive electrode and the cell wall is filled with a coarse, porous zinc skeleton, which is preferably formed by corrugating perforated sheet zinc or zinc wire fabric, and rolling or folding it upon itself to form a plurality of layers, in the interstices of which the jelly-like electrolyte is firmly held.

With this construction, when a shrinking of the electrolyte takes place under continued use, the zinc electrode, containing the jelly-like electrolyte, tends merely to contract in the space, which is naturally formed between the electrolyte and the wall of the cell, and the circuit between the positive and negative electrode is not affected. This constitutes the present invention, which is illustrated in the accompanying drawing, in which—

Figure 1:
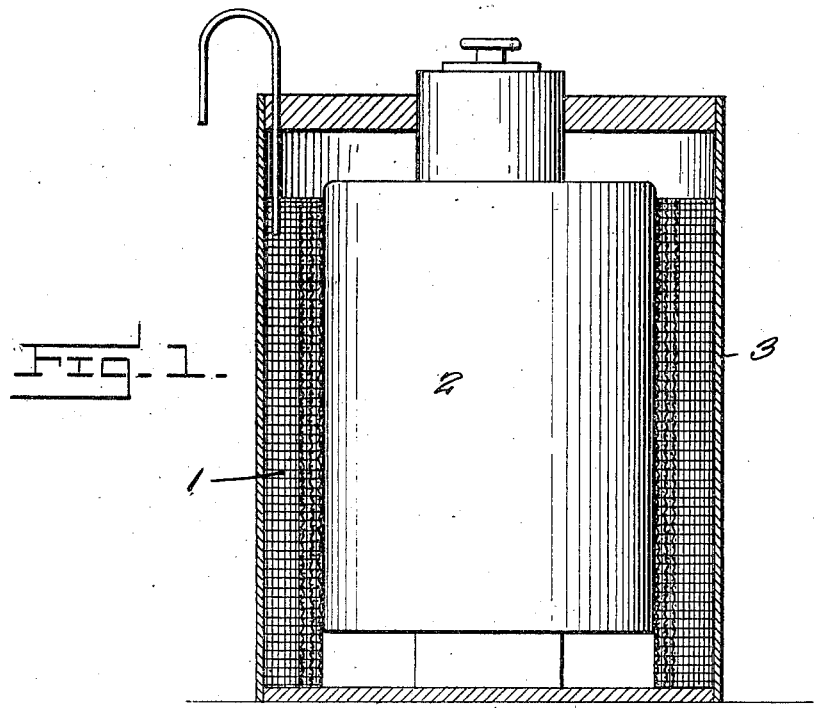
Figure 2:
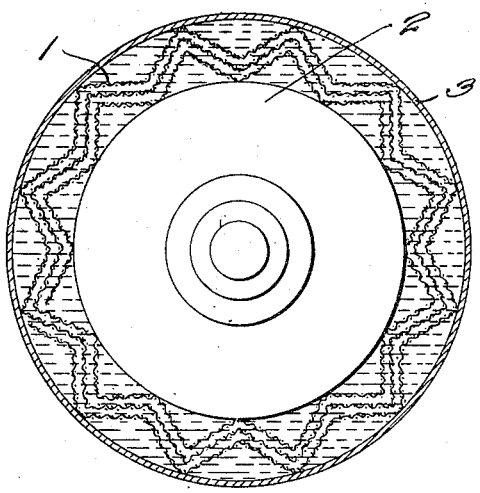

Figure 1 is a vertical section through a cell equipped with my improved negative electrode. Fig. 2 is a sectional plan view of the same and Fig. 3 a similar view of a modified construction.

As appears in these views, the negative electrode 1 consists of perforated sheet zinc or wire fabric, which is corrugated and rolled or folded upon itself in several layers, so that the electrode thus formed will be thick enough to completely fill the space between the positive electrode 2 and the wall of the cell 3.

Figure 3:
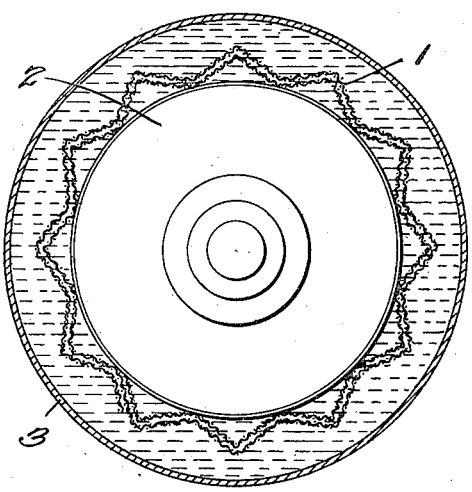

In another form of the invention shown in Fig. 3, the zinc skeleton 1 of wire fabric or perforated sheet metal is rolled directly around the positive electrode 2, which is surrounded by insulating material 4.

Having thus described my invention, what I claim is:—

A dry battery cell comprising the combination of a central rigid positive electrode, a negative electrode surrounding the same and consisting of a plurality of layers of corrugated, finely perforated zinc, and a semisolid electrolyte surrounding and contained within said zinc, whereby shrinking of the electrolyte does not affect its contact with the negative electrode.

In testimony whereof I have hereunto set my hand in presence of two subscribing witnesses.

JULIUS ADOLPH ERWIN ACHENBACH.

Witnesses:
ERNEST H. L. MUMMENHOFF,
IDA CHRIST HAFERMANN.

Copies of this patent may be obtained for five cents each, by addressing the "Commissioner of Patents, Washington, D. C."